US012780594B2

(12) United States Patent
Matsuda et al.

(10) Patent No.: US 12,780,594 B2
(45) Date of Patent: Nov. 3, 2026

(54) WIRE WINDING DEVICE AND WIRE WINDING METHOD

(71) Applicant: NITTOKU Co., Ltd., Saitama-city (JP)

(72) Inventors: Tsukasa Matsuda, Fukushima (JP); Yuta Kato, Fukushima (JP)

(73) Assignee: NITTOKU Co., Ltd., Saitama-city (JP)

( * ) Notice: Subject to any disclaimer, the term of this patent is extended or adjusted under 35 U.S.C. 154(b) by 331 days.

(21) Appl. No.: 18/683,576

(22) PCT Filed: Jun. 27, 2023

(86) PCT No.: PCT/JP2023/023771
§ 371 (c)(1),
(2) Date: Feb. 14, 2024

(87) PCT Pub. No.: WO2025/004173
PCT Pub. Date: Jan. 2, 2025

(65) Prior Publication Data
US 2026/0138846 A1 May 21, 2026

(51) Int. Cl.
*B65H 54/28* (2006.01)
*G06T 7/00* (2017.01)
(Continued)

(52) U.S. Cl.
CPC ....... *B65H 54/2854* (2013.01); *G06T 7/0006* (2013.01); *G06T 7/13* (2017.01);
(Continued)

(58) Field of Classification Search
CPC ................ B65H 54/28; B65H 54/2854; B65H 54/2875; B65H 54/286; B65H 54/12;
(Continued)

(56) References Cited

U.S. PATENT DOCUMENTS

| | | | | |
|---|---|---|---|---|
| 4,424,939 A | | 1/1984 | Ohashi et al. | |
| 8,857,752 B2 | * | 10/2014 | Saito | B65H 54/286 242/478.2 |
| 2002/0030134 A1 | | 3/2002 | Sugiuchi | |

FOREIGN PATENT DOCUMENTS

| | | | | |
|---|---|---|---|---|
| CA | 2295041 A1 | | 12/1998 | |
| CH | 653654 A5 | * | 1/1986 | B65H 5/2875 |
| EP | 0602504 A1 | * | 6/1994 | B65H 54/2875 |
| IT | 1219381 B | * | 5/1990 | B65H 54/2872 |

(Continued)

*Primary Examiner* — Victoria P Augustine
*Assistant Examiner* — Henrix Soto
(74) *Attorney, Agent, or Firm* — Rabin & Berdo, P.C.

(57) ABSTRACT

A wire winding device for winding a wire rod delivered from a nozzle around a winding core includes: the nozzle configured to deliver the wire rod from a tip end portion; the winding core having a winding body portion and a first flange portion, the winding body portion being configured such that the wire rod delivered from the nozzle is wound around the winding body portion, and the first flange portion being provided on one end side of the winding body portion; and a control unit configured to control rotation of either one of the nozzle or the winding core serving as a rotated member, wherein the control unit computes a required rotation angle of the rotated member based on a space length between the wire rod and the first flange portion measured during a process of the wire rod is being wound around the winding body portion towards the first flange portion, and rotates the rotated member by the required rotation angle.

6 Claims, 3 Drawing Sheets

(51) Int. Cl.
*G06T 7/13* (2017.01)
*G06T 7/60* (2017.01)

(52) U.S. Cl.
CPC ............ *G06T 7/60* (2013.01); *B65H 2404/40* (2013.01); *B65H 2553/42* (2013.01); *B65H 2553/60* (2013.01); *G06T 2207/30136* (2013.01)

(58) Field of Classification Search
CPC ............ B65H 2553/40; B65H 2553/41; B65H 2553/416; B65H 2553/42; H01F 41/04; H01F 41/06; H01F 41/064; H01F 41/082
See application file for complete search history.

(56) References Cited

FOREIGN PATENT DOCUMENTS

| | | | | | |
|---|---|---|---|---|---|
| JP | S617176 | A | * | 1/1986 | |
| JP | S6197908 | A | | 5/1986 | |
| JP | S61107714 | A | | 5/1986 | |
| JP | H01203174 | A | * | 8/1989 | |
| JP | H06181139 | A | | 6/1994 | |
| JP | H08124777 | A | | 5/1996 | |
| JP | 2002043157 | A | | 2/2002 | |
| JP | 2010111453 | A | * | 5/2010 | |
| JP | 4506148 | B2 | * | 7/2010 | |
| JP | 2010-183041 | A | | 8/2010 | |
| JP | 2017206365 | A | * | 11/2017 | ............. B65H 54/28 |
| KR | 20230009575 | A | | 1/2023 | |
| WO | WO-2007074587 | A1 | * | 7/2007 | ........... H01F 41/082 |
| WO | WO-2020027154 | A1 | * | 2/2020 | ......... B65H 54/2851 |

* cited by examiner

WIRE WINDING DEVICE AND WIRE WINDING METHOD

TECHNICAL FIELD

The present invention relates to a wire winding device and a wire winding method.

BACKGROUND ART

JP2010-183041A discloses a wire winding device that winds a wire rod delivered from a nozzle around a winding core.

SUMMARY OF INVENTION

In the wire winding device described in JP2010-183041A, the winding is performed such that the overall length of a coil becomes a constant length by reducing an impact of shape errors in the wire rod on the overall length of the coil. However, in a case in which there are significant manufacturing errors in the winding core around which the wire rod is to be wound and there is variability in the distance between flange portions, if the wire winding is performed such that the overall length of the coil becomes the target length, the newly wound wire rod rides up on the wire rod that has already been wound in the vicinity of the flange portion when the wire winding is performed for the winding core, the distance between the flange portions of which is shorter than the target length, and a gap is formed in the vicinity of the flange portion when the wire winding is performed for the winding core, the distance between the flange portions of which is longer than the target length. As a result, there is a risk in that the winding accuracy for the winding core is lowered.

An object of the present invention is to improve a winding accuracy to a winding core.

According to one aspect of the present invention, a wire winding device for winding a wire rod delivered from a nozzle around a winding core, the wire winding device includes: the nozzle configured to deliver the wire rod from a tip end portion; the winding core having a winding body portion and a flange portion, the winding body portion being configured such that the wire rod delivered from the nozzle is wound around the winding body portion, and the flange portion being provided on one end side of the winding body portion; and a control unit configured to control rotation of either one of the nozzle or the winding core serving as a rotated member, wherein the control unit computes a required rotation angle of the rotated member based on a space length between the wire rod and the flange portion measured during a process of the wire rod is being wound around the winding body portion towards the flange portion, and rotates the rotated member by the required rotation angle.

According to another aspect of the present invention, a wire winding method of winding a wire rod delivered from a nozzle around a winding core by rotating either one of the nozzle or the winding core serving as a rotated member, the wire winding method includes: a step of measuring a space length between the wire rod and a flange portion of the winding core during a process of the wire rod is being wound around a winding body portion of the winding core towards the flange portion; a step of computing a required rotation angle of the rotated member based on the space length; and a step of rotating the rotated member by the required rotation angle.

DESCRIPTION OF EMBODIMENTS

In the following, a wire winding device and a wire winding method according to an embodiment of the present invention will be described with reference to the drawings.

Figure 1:
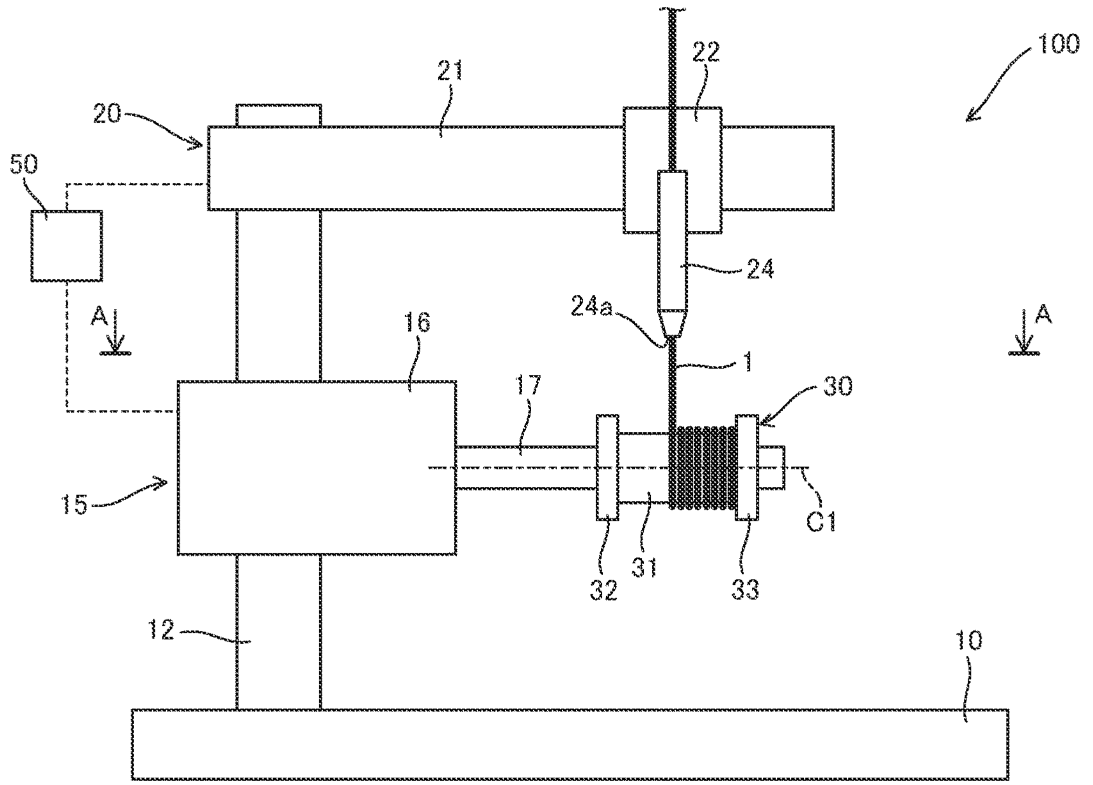
FIG. 1 is a side view showing a configuration of a wire winding device according to an embodiment of the present invention.

A wire winding device 100 is a device that manufactures a regular wound coil by regular winding a wire rod 1 delivered from a nozzle 24 around a winding core 30, and as shown in FIG. 1, the wire winding device 100 includes: the nozzle 24 that delivers the wire rod 1 from a tip end portion 24*a*; the winding core 30 that has a winding body portion 31 around which the wire rod 1 delivered from the nozzle 24 is wound; a nozzle moving device 20 that moves the nozzle 24 at a predetermined pitch speed; a rotation device 15 that rotates the winding core 30, serving as a rotated member, about a rotation axis C1; and a control unit 50 that controls the nozzle moving device 20 and the rotation device 15. Although FIG. 1 is a side view of the wire winding device 100, an illustration of an image acquisition device 40, which will be described below, is omitted.

The nozzle 24 is a member formed to have a tubular shape and has a through hole (not shown) that penetrates through the nozzle 24 in the axial direction. The nozzle 24 is attached to the nozzle moving device 20 such that the tip end portion 24*a* at which one end of the through hole opens faces the winding core 30 side, and the nozzle 24 guides the wire rod 1 supplied from a source of the wire rod (not shown) to the winding core 30 by delivering it from the tip end portion 24*a*.

The winding core 30 is a so-called bobbin made of a resin, and has the winding body portion 31 having a barrel shape around which the wire rod 1 is to be wound, a first flange portion 32, serving as a flange portion, that is provided on the one end side of the winding body portion 31, and a second flange portion 33 that is provided on the other end side of the winding body portion 31.

The nozzle moving device 20 is configured of an electric slider 21 capable of reciprocatingly moving a movable piece 22 along the direction of the rotation axis C1 of the winding core 30, and the above-described nozzle 24 is attached to the movable piece 22.

The rotation device 15 is formed of an electric motor 16 and a spindle 17 attached to the rotation axis of the electric motor 16, and a tip end portion of the spindle 17 has a shape capable of holding the winding core 30 having the above-described configuration.

The electric motor 16 is provided with a rotary encoder (not shown), and it is possible to detect an instantaneous rotation angle of the rotation axis of the electric motor 16. In addition, it is also possible to obtain the instantaneous rotation angle of the winding core 30 rotated by the electric motor 16 via the spindle 17 from the detection value from the rotary encoder.

As shown in FIG. 1, the nozzle moving device 20 and the rotation device 15 are supported by a column 12 that is erected on a base 10. The column that supports the nozzle moving device 20 may be different column from the column that supports the rotation device 15.

The control unit 50 controls operation of the nozzle moving device 20 and the rotation device 15 in accordance with a content input by an operator with an input device (not shown). The specific control performed by the control unit 50 will be described in detail in the description of the wire winding method, which will be described later.

Specifically, the control unit 50 is formed of a microcomputer including a CPU (a central processing unit), a ROM (a read-only memory), a RAM (a random-access memory), and an I/O interface (an input/output interface). The RAM stores data from processing executed by the CPU, the ROM pre-stores a control program, etc. for the CPU, and the I/O interface is used for input/output of information with the nozzle moving device 20, the rotation device 15, and the image acquisition device 40 (described later), which are connected to the control unit 50, and the input device (not shown) and a display device (not shown).

As described above, when the winding core 30 is formed of a resin in particular, there is a risk in that the position of each of the flange portions 32 and 33 with respect to the winding body portion 31 is deviated due to a manufacturing error, and an individual difference is caused in a length of the winding body portion 31, in other words, the size of a space between the first flange portion 32 and the second flange portion 33.

Therefore, for example, in a case in which wire winding of a first layer is performed from the second flange portion 33 side towards the first flange portion 32 such that the overall length of the coil manufactured by the wire winding device 100 becomes the target length set in advance, if the wire winding is performed for the winding core 30 whose length of the winding body portion 31 is shorter than the target length, the newly wound wire rod 1 rides up on the wire rod 1 that has already been wound in the vicinity of the first flange portion 32, and conversely, if the wire winding is performed for the winding core 30 whose length of the winding body portion 31 is longer than the target length, a gap is formed in the vicinity of the first flange portion 32, and as a result, the winding accuracy for the winding core 30 is lowered.

Thus, the wire winding device 100 of this embodiment further includes the image acquisition device 40 serving as a distance measuring device for improving the winding accuracy for the winding core 30 even in a case in which the manufacturing error of the winding core 30 is relatively large.

Figure 2:
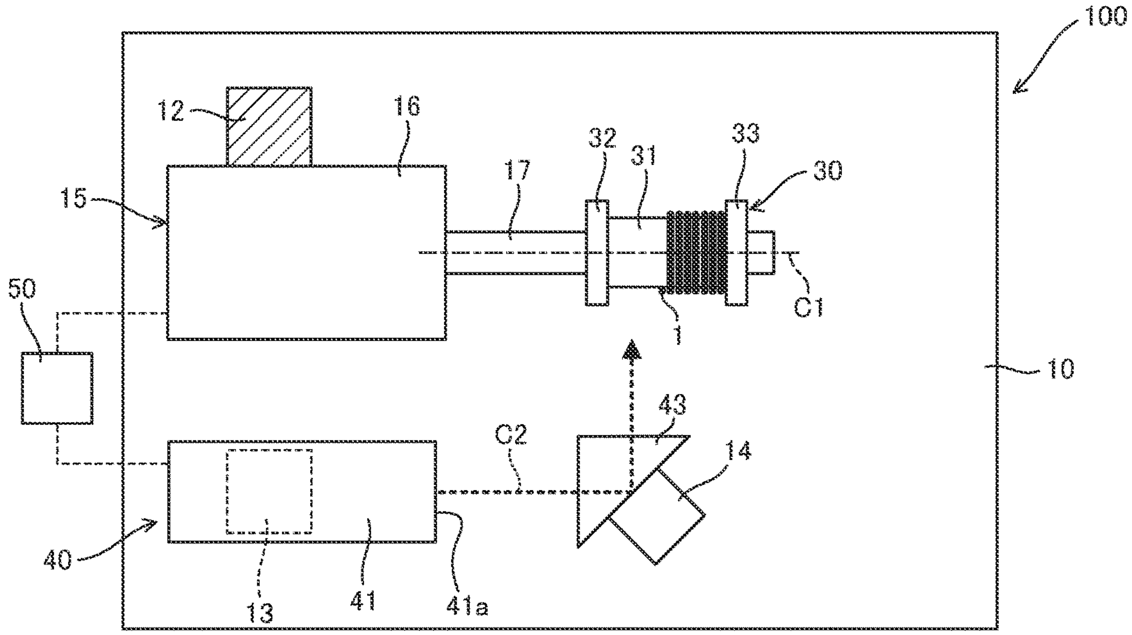
FIG. 2 is a sectional view showing a cross-section taken along a line A-A in FIG. 1.

For example, the image acquisition device 40 is a device provided on the base 10 for acquiring an image of the first flange portion 32 and the wire rod 1 during the process of the wire rod 1 is being wound around the winding body portion 31 from the second flange portion 33 side towards the first flange portion 32, and as shown in FIG. 2, the image acquisition device 40 mainly includes a camera 41 and a mirror 43 that is provided on the image acquisition direction of the camera 41. In addition, the image acquisition device 40 may includes a lighting device and a white or metallic glossy member serving as a background screen.

The camera 41 is a digital camera with a number of pixels and field of view size sufficient to adequately identify the shapes of the first flange portion 32, the winding body portion 31, and the wire rod 1 from the acquired image data, and the camera 41 is supported by a column 13 that is erected on the base 10 such that the height of an image acquisition center C2 is substantially the same as the height near an upper end of the winding body portion 31 of the winding core 30. In other words, the height of the image acquisition center C2 of the camera 41 is set such that the wire rod 1 extending from the nozzle 24 to the winding body portion 31 and the first flange portion 32 of the winding core 30 are at least included within the field of view for the image acquisition.

In addition, the camera 41 is connected to the control unit 50, the timing of the image acquisition is controlled by the control unit 50, and the acquired image data is transmitted to the control unit 50.

The mirror 43 is a right-angle prism mirror having a reflective surface that redirects the direction in which an image acquisition surface 41*a* of the camera 41 faces (the image acquisition center C2 direction) to the winding core 30 side, and the mirror 43 is supported by a column 14 that is erected on the base 10 such that the height of the center position thereof is substantially the same as the height of the image acquisition center C2.

Specifically, the direction in which the image acquisition surface 41*a* of the camera 41 faces (the image acquisition center C2 direction) and the angle and position of the mirror 43 are set such that an analysis image P, which will be described below, acquired by the camera 41 includes a region including a part of the winding body portion 31 just before the wire rod 1 delivered from the nozzle 24 is wound, in other words, the analysis image P includes the wire rod 1 that is shown as if extending radially outward from the winding body portion 31 and the winding body portion 31 and the first flange portion 32 of the winding core 30.

The camera 41 may be arranged such that the image acquisition surface 41*a* directly faces the vicinity of the upper end of the winding body portion 31 of the winding core 30 without the mirror 43. In this case, although the mirror 43 is not required any more, because a main body of the camera 41 including a lens needs to be arranged along the direction perpendicular to the rotation axis C1, there is a risk in that the size of the entire wire winding device 100 is increased. Therefore, in order to make the entire wire winding device 100 compact, it is preferable to use the mirror 43 appropriately.

Figure 3:
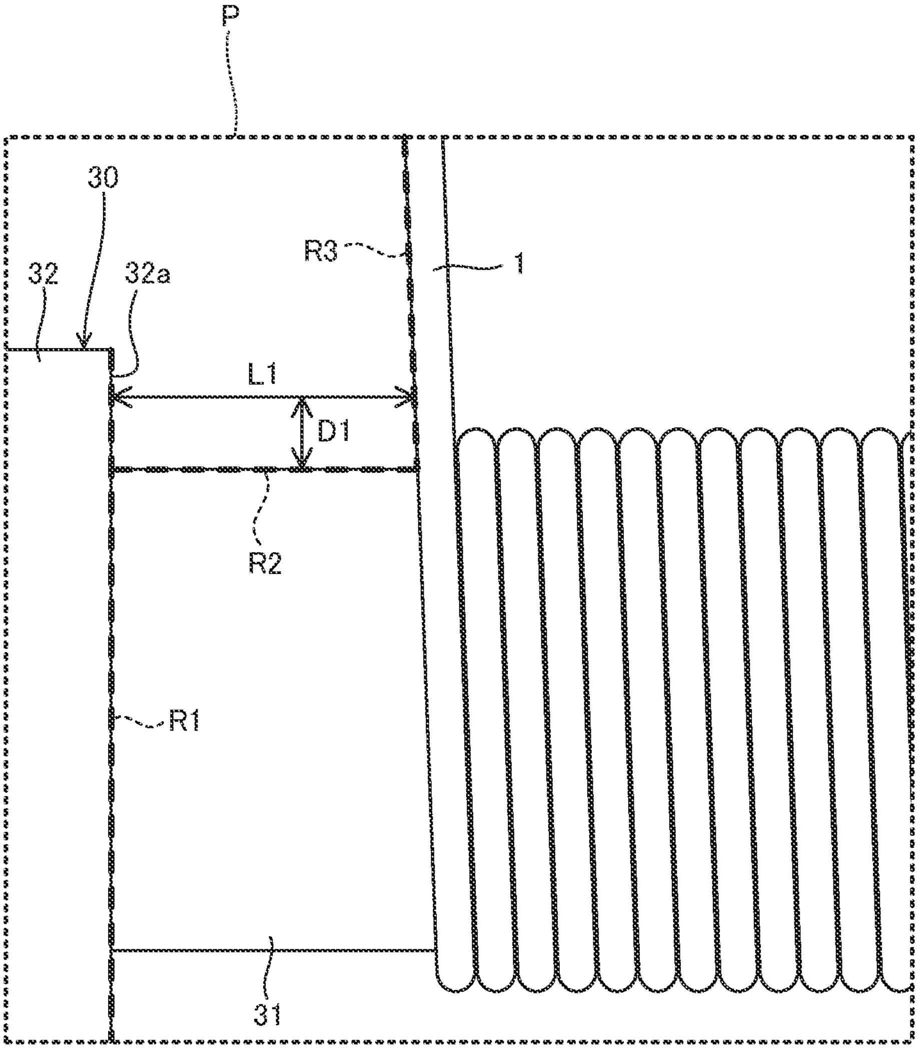
FIG. 3 is a diagram showing an example of an image acquired by an image acquisition device.

The analysis image P acquired by the image acquisition device 40 having such a configuration will be described with reference to FIG. 3. FIG. 3 shows an example of the analysis image P acquired by the image acquisition device 40.

As described below, the camera 41 performs the image acquisition at the timing instructed by the control unit 50 such that the analysis image P includes the first flange portion 32 and the wire rod 1 during the process of the wire rod 1 is being wound around the winding body portion 31 from the second flange portion 33 side towards the first flange portion 32.

By performing image processing on the digital data of the analysis image P, the control unit 50 extracts an edge line of the wire rod 1 on the first flange portion 32 side and an end surface 32*a* of the first flange portion 32, and computes a space length L1 between the edge line and the end surface 32*a*.

Specifically, as shown in FIG. 3, after recognizing a first line segment R1 extending along the end surface 32*a* of the first flange portion 32, a second line segment R2 extending along the upper end of the winding body portion 31, and a third line segment R3 extending along the first flange portion 32 side of the wire rod 1, the distance between the first line segment R1 and the third line segment R3, in parallel with the second line segment R2, at a position separated from the second line segment R2 by a preset specified distance DI is computed as the space length L1.

The method of computing the space length L1 is not limited thereto, and the space length L1 may be computed from two line segments, the first line segment R1 extending along the end surface 32*a* of the first flange portion 32 and the third line segment R3 extending along the first flange portion 32 side of the wire rod. In addition, the space length L1 may also be computed within a region over an image of the winding body portion 31. However, if color and gross are similar between the winding body portion 31 and its surrounding parts, there is a risk in that it becomes difficult to accurately recognize, for example, the end surface 32*a* of the first flange portion 32 and/or the edge line of the wire rod 1 on the first flange portion 32 side. Therefore, it is preferable to compute the space length L1 on the basis of each of the above-described line segments R1, R2, and R3, recognition of which becomes relatively easier by setting the background color to white, etc.

The computation of the space length L1 may be performed by a computing unit provided in the image acquisition device 40 instead of the control unit 50, and in this case, the size of the space length L1 is transmitted from the image acquisition device 40 to the control unit 50.

Figure 4:
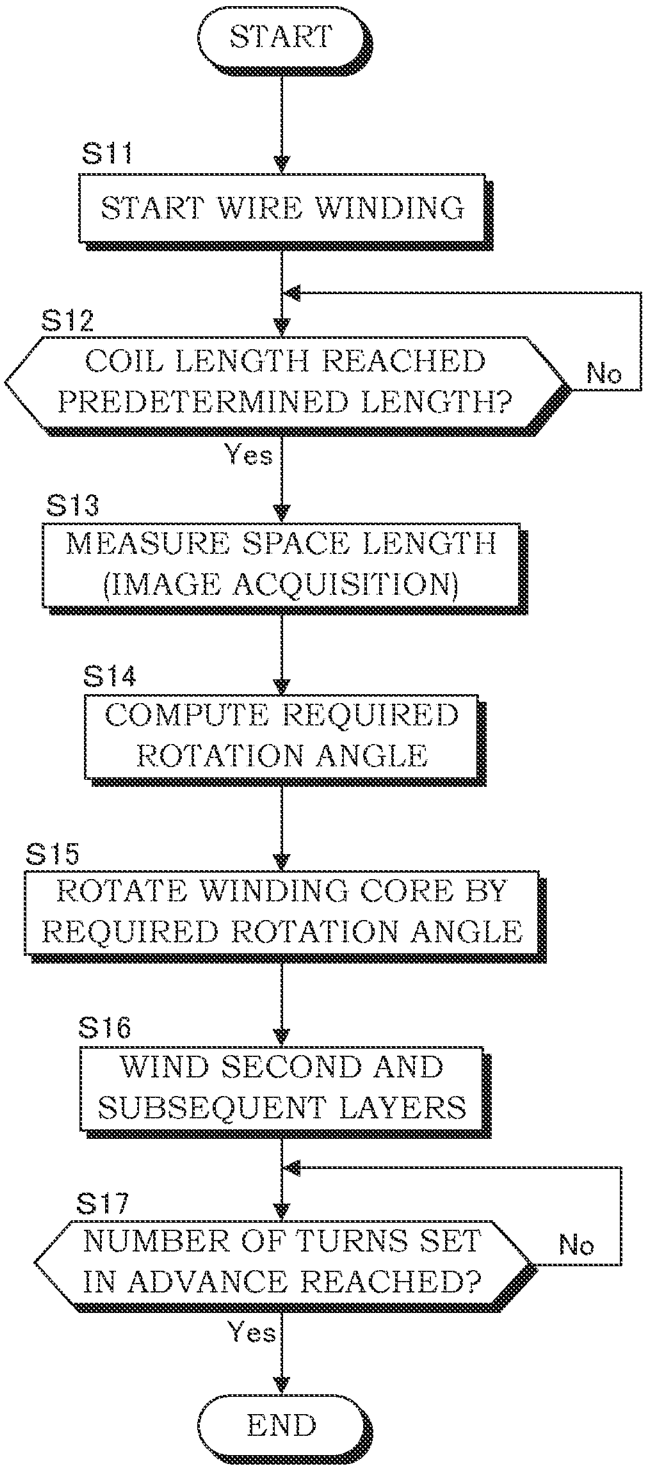
FIG. 4 is a flow chart showing a procedure of wire winding performed by a wire winding method according to the embodiment of the present invention.

Next, the wire winding method that is performed by the wire winding device 100 having the above-described configuration will be described with reference to the flow chart shown in FIG. 4.

When the operator operates a coil manufacturing start button, etc., in Step S11, the control unit 50 starts winding of the wire rod 1 around the winding core 30. In the following, a description will be given of a case in which a tip end portion of the wire rod 1 is held on the second flange portion 33 side, and the wire rod 1 is wound around the winding body portion 31 from the second flange portion 33 side towards the first flange portion 32.

Specifically, the control unit 50 moves the nozzle 24 towards the first flange portion 32 by moving the movable piece 22 at a pre-input pitch speed by the electric slider 21 and rotates the winding core 30 by rotationally driving the electric motor 16. As a result, the wire rod 1 is gradually wound around the winding body portion 31 towards the first flange portion 32.

As the driving of the electric motor 16 and the electric slider 21 is controlled by the control unit 50 and the wire winding is started, in subsequent Step S12, the control unit 50 determines whether or not a length of the coil formed on the winding core 30 has reached a predetermined length at which the space length L1 should be measured.

Specifically, when the distance travelled by the nozzle 24 along the direction of the rotation axis C1 since the start of the wire winding has reached at least two-thirds, preferably at least three-quarters of the overall length of the planned coil, the control unit 50 determines that the state in which the space length L1 should be measured has been reached, and the process proceeds to Step S13. On the other hand, when the control unit 50 determines that the state in which the space length L1 should be measured has not been reached yet, the wire winding is continued. Whether or not the state in which the space length L1 should be measured has reached may be determined by determining whether or not the total number of rotations of the winding core 30 or the total number of rotations of the electric motor 16 since the start of the wire winding has reached a predetermined number of rotations.

In subsequent Step S13, the control unit 50 instructs the image acquisition device 40 to acquire the analysis image P.

The image acquisition device 40, which has received the instruction for the image acquisition, acquires the analysis image P, in which the first flange portion 32 and the wire rod 1 during the process of the wire rod 1 is being wound around the winding body portion 31 towards the first flange portion 32 are included in a single image, and the image acquisition device 40 transmits the analysis image P to the control unit 50.

In addition, in Step S13, the control unit 50 obtains the rotation angle of the winding core 30 at the time when the analysis image P was acquired from the detection value from the rotary encoder, and the control unit 50 stores thus-obtained rotation angle as a start position for starting the count of a required rotation angle RA, which will be described below.

Note that if the rotation speed of the winding core 30 is high, the analysis image P may become out of focus, and so, it may become difficult to extract the edge line of the wire rod 1 on the first flange portion 32 side and/or the end surface 32*a* of the first flange portion 32. Therefore, when the analysis image P is to be acquired in Step S13, the rotation speed of the winding core 30 may be reduced or the rotation of the winding core 30 may be stopped temporarily.

As described above, the control unit 50 that has received the analysis image P then computes the space length L1 by performing the image processing (see FIG. 3).

In subsequent Step S14, on the basis of thus-computed space length L1, the control unit 50 computes the required rotation angle RA that is the rotation angle of the winding core 30 (the rotated member) required until the wire rod 1 wound around the winding body portion 31 comes into contact with the end surface 32*a* of the first flange portion 32.

The required rotation angle RA refers to the rotation angle that indicates how much more rotations of the winding core 30 is required from the rotation angle of the winding core 30 at the time when the space length L1 was measured, in other words, at the time when the analysis image P was acquired to bring the wire rod 1 delivered from the nozzle 24 to come into contact with the end surface 32*a* of the first flange portion 32, and the required rotation angle RA refers to the rotation angle of the winding core 30 required to wind the wire rod 1 over the measured space length L without excess or shortage.

Specifically, the required rotation angle RA is obtained by the following formula (1) from a moved distance X1 of the nozzle 24 along the direction of the rotation axis C1 during one rotation of the winding core 30 (the pitch speed) and the space length L1.

$$RA = (L1/X1) \times 360 \quad (1)$$

An integer part of a value obtained by dividing the space length L1 by the moved distance X1 may be defined as a required number of rotation RA1, and a value obtained by multiplying a decimal part by 360 may be defined as a required angle RA2, and thereby, the number of rotations and the rotation angle for the winding core 30 (the rotated member) may be calculated separately. In this case, the sum of the required number of rotation RA1 and the required angle RA2 substantially corresponds to the required rotation angle RA described above.

For example, when the moved distance X1 is 0.2 mm and the space length L1 is 0.75 mm, the required rotation angle RA is 1350°. In addition, in this case, the required number of rotation RA1 is three rotations, and the required angle RA2 is 270°.

In addition, the control unit 50 compares the number of turns of the first layer planned in advance and the number of turns when the first layer is wound by rotating the winding core 30 by the required rotation angle RA from the rotation angle of the winding core 30 at the time when the analysis image P was acquired, and the difference is stored as the number of over/under turns. The number of turns may be converted into the wire winding length of the wire rod 1, and the number of over/under turns may be stored as excessive/deficient wire rod length.

In Step S14, when the required rotation angle RA is calculated, the control unit 50 further rotates the winding core 30 by the required rotation angle RA in subsequent Step S15.

Specifically, by rotationally driving the electric motor 16, the winding core 30 is rotated until the required rotation angle RA is achieved for the rotation angle of the winding core 30, the count of which has started from the rotation angle of the winding core 30 at the time when the analysis image P was acquired, and the movable piece 22 is moved by the electric slider 21 at the pre-input pitch speed.

As a result, the wire rod 1 delivered from the nozzle 24 is wound around the winding body portion 31 without excess or shortage until a state in which the wire rod 1 substantially comes into contact with the end surface 32*a* of the first flange portion 32 without riding up on the wire rod 1 that has already been wound in the vicinity of the first flange portion 32 is achieved.

As long as the wire winding is performed until the rotation angle of the winding core 30, the count of which has started from the rotation angle of the winding core 30 at the time when the analysis image P was acquired, eventually reaches the required rotation angle RA, the wire winding after the acquisition of the analysis image P in Step S13 may be resumed without waiting for the completion of the measurement of the space length L and the computation of the required rotation angle RA or the wire winding may be resumed after the completion of these computations, etc.

As described above, as the wire winding of the first layer is completed by winding the wire rod 1 such that substantially no gap is formed between the wire rod 1 and the end surface 32*a* of the first flange portion 32, the process proceeds to Step S16, and the wire winding is started for the second and subsequent layers.

The wire winding of the second and subsequent layers is performed in the same manner as the first layer, with the same number of turns as the wire winding of the first layer, but without computing the required rotation angle RA. The wire winding of the outermost layer is set to the number of turns that is adjusted in accordance with the number of over/under turns stored in Step S14 with respect to the number of turns planned in advance.

Here, when the wire winding of the second and subsequent layers is performed, there may be a case in which the size of the gap between the wire rod 1 is increased or decreased slightly during the wire winding causing the winding width to become different from the winding width of the first layer depending on errors in diameter of the wire rod 1, the shape of the wire rod 1, and an accuracy of a delivery speed of the nozzle 24. In such a case, even if the wire winding is performed for the same number of turns as that for the wire winding of the first layer, there is a risk in that the newly wound wire rod 1 rides up on the wire rod 1 that has already been wound in the vicinity of the flange portions 32 and 33 or a gap is formed in the vicinity of the flange portions 32 and 33.

Therefore, the calculation of the space length L and the computation of the required rotation angle RA may be performed not only for the wire winding of the first layer, but also for the wire winding of the second and subsequent layers, and for example, the calculation and the computation may be executed for the wire winding performed on layers in a predetermined order, such as a third layer and a seventh layer, or they may be executed for every wire winding performed on all of the layers.

For the wire winding of the second layer and a fourth layer, in which the wire rod 1 delivered from the nozzle 24 is wounded around the winding body portion 31 towards the second flange portion 33 not the first flange portion 32, if the calculation of the space length L and the computation of the required rotation angle RA are to be executed, the image acquisition device 40 acquires the analysis image P, in which the second flange portion 33 and the wire rod 1 during the process of the wire rod 1 is being wound around the winding body portion 31 towards the second flange portion 33 are included in a single image. In this case, the second flange portion 33 corresponds to the flange portion, and the space length L1 is the distance between an edge line of the wire rod 1 on the second flange portion 33 side and an end surface of the second flange portion 33. In addition, the image acquisition device 40 that performs the image acquisition of the vicinity of the second flange portion 33 may be an image acquisition device capable of performing the image acquisition of both of the vicinity of the first flange portion 32 and the vicinity of the second flange portion 33 by, for example, changing the position of the mirror 43, or this image acquisition device 40 may be an image acquisition device that is provided separately from the image acquisition device 40 that performs the image acquisition of the vicinity of the first flange portion 32.

As described above, by executing the calculation of the space length L and the computation of the required rotation angle RA even when the wire winding of the second and subsequent layers is performed, it becomes possible to wind the wire rod 1 around the winding core 30 without excess or shortage when the wire winding is performed on each layer.

In general, because the performance of the coil varies depending on the number of turns and the length of the wound wire, as the wire winding of the second and subsequent layers is started, in Step S17, in order to achieve the required performance, the control unit 50 determines whether or not the number of turns of the coil has reached the design number of turns set in advance, or whether or not the length of the wire rod 1 used for the wire winding of the coil has reached the design length set in advance.

When it is determined that the number of turns of the coil has reached the design number of turns set in advance, or when it is determined that the length of the wire rod 1 used for the wire winding of the coil has reached the design length set in advance, the control unit 50 stops the electric motor 16 and the electric slider 21 to terminate the wire winding.

By performing the above-described steps, the wire winding of the wire rod 1 around the winding core 30 is completed, and the regular wound coil having a predetermined specification is formed on the winding core 30.

According to the above embodiments, following effects are afforded.

In the wire winding device 100 having the above-described configuration, the control unit 50 computes the required rotation angle RA of the winding core 30 serving as the rotated member on the basis of the space length L between the wire rod 1 and the first flange portion 32 measured during the process of the wire rod 1 delivered from the nozzle 24 is being wound around the winding body portion 31 towards the first flange portion 32 serving as the flange portion, and rotates the winding core 30 by the required rotation angle RA.

As described above, by obtaining the required rotation angle RA of the winding core 30 required to wind, without excess or shortage, the wire rod 1 over the space length L between the wire rod 1 and the first flange portion 32 measured during the process of the wire rod 1 is being wound around the winding body portion 31 towards the first flange portion 32 and by rotating the winding core 30 by the required rotation angle RA, even when there are the individual differences in the length of the winding body portion 31 due to the manufacturing error, etc. of the winding core 30, it is possible to prevent the newly wound wire rod 1 from riding up on the wire rod 1 that has already been wound in the vicinity of the first flange portion 32 and to prevent the formation of the gap in the vicinity of the first flange portion 32. As a result, it is possible to improve the winding accuracy for the winding core 30.

In addition, according to the wire winding device 100 having the above-described configuration, even when the manufacturing error of the winding core 30 is relatively large or even when a guide groove, etc. for defining the position of the wire rod 1 on the first layer is not formed in the winding body portion 31, it is possible to wind the wire rod 1 around the winding core 30 without excess or shortage. Therefore, it is possible to reduce the manufacturing cost of the winding core 30 and to reduce the manufacturing cost of the coil formed around the winding core 30.

Following modifications are also within the scope of the present invention, and it is also possible to combine the configurations shown in the modification with the configurations described in the above-described embodiment, and to combine the configurations described in the following different modifications.

In the above-mentioned embodiment, a description has been given of a case in which the wire winding device 100 is a wire regular-winding device in which the winding core 30 is provided as the rotated member. Instead of this case, the wire winding device may be a wire regular-winding device of a flyer type in which the nozzle 24 is provided as the rotated member, and in this case, the control unit 50 controls rotation of the nozzle 24 that is rotated around the winding core 30 while delivering the wire rod 1.

In addition, in the above-mentioned embodiment, the calculation of the space length L and the computation of the required rotation angle RA are executed when the wire winding of the first layer is performed on the winding core 30. In addition, the calculation of the space length L and the computation of the required rotation angle RA may be executed not only when the wire winding of the first layer is performed on the winding core 30, but also when the wire winding of the second and subsequent layers is performed. Alternatively, in a case in which the winding body portion 31 is formed with the guide groove for defining the position of the wire rod 1 of the first layer, the calculation and the computation may not be executed when the wire winding of the first layer is performed on the winding core 30, but they may be executed when the wire winding of the second and subsequent layers is performed.

In addition, in the above-mentioned embodiment, the wire rod 1 has a circular cross-sectional shape. Instead, the cross-sectional shape of the wire rod 1 may be rectangular or polygonal shape. In addition, in the above-mentioned embodiment, an outer circumferential surface of the winding body portion 31 around which the wire rod 1 is to be wound has a circular cross-sectional shape. Instead, the cross-sectional shape of the winding body portion 31 may be rectangular or polygonal shape.

In addition, in the above-mentioned embodiment, the winding core 30 is made of resin. Instead, the winding core 30 may be a bobbin made of metal.

In addition, in the above-mentioned embodiment, in the winding core 30, the winding body portion 31 and both of the flange portions 32 and 33 are formed integrally. Instead, in the winding core 30, the winding body portion 31 and both of the flange portions 32 and 33 may be formed as separate members. In addition, the winding core 30 may be formed of the winding body portion 31 and either one of the flange portions 32 and 33, or a portion of the spindle 17 may be utilized as the winding body portion 31 of the winding core 30.

In addition, in the above-mentioned embodiment, the moved distance X1 used for the calculation of the required rotation angle RA is a value set in advance. Instead, similarly to the space length L1, the moved distance X1 may be obtained from the analysis image P. Specifically, the width of the wire rod 1 in the direction along the direction of the rotation axis C1 when the wire rod 1 is wound around the winding body portion 31 may be measured from the analysis image P, and the required rotation angle RA may be calculated by considering the thus-measured width as the moved distance X1, which is the distance the nozzle 24 travels along the direction of the rotation axis C1 during one full rotation of the winding core 30.

In addition, in the above-mentioned embodiment, the measurement of the space length L1 is performed by using the analysis image P acquired by the camera 41. Instead, the measurement of the space length L1 may be performed by a laser distance measuring device such as 2D-LiDAR (Light Detection and Ranging) sensor, etc., and for example, it may be possible to measure the space length L1 from the shape of the winding core 30 including the wire rod 1 obtained by irradiating a laser onto the first flange portion 32 and the portion of the winding body portion 31 just before the wire rod 1 delivered from the nozzle 24 is wound, or by irradiating a laser along the rotation axis C1 from the first flange portion 32 towards the second flange portion 33.

The configurations, operations, and effects of the embodiments of the present invention will be collectively described below.

The wire winding device 100 includes: the nozzle 24 configured to deliver the wire rod 1 from the tip end portion 24*a*; the winding core 30 having the winding body portion 31 and the first flange portion 32, the winding body portion 31 being configured such that the wire rod 1 delivered from the nozzle 24 is wound around the winding body portion 31, and the first flange portion 32 being provided on one end side of the winding body portion 31; and the control unit 50 configured to control rotation of either one of the nozzle 24 or the winding core 30 serving as the rotated member, wherein the control unit 50 computes the required rotation angle RA of the rotated member based on the space length L1 between the wire rod 1 and the first flange portion 32 measured during the process of the wire rod 1 is being wound around the winding body portion 31 towards the first flange portion 32, and rotates the rotated member by the required rotation angle RA.

With this configuration, by obtaining the required rotation angle RA of the rotated member required to wind, without excess or shortage, the wire rod 1 over the space length L between the wire rod 1 and the first flange portion 32 measured during the process of the wire rod 1 is being wound around the winding body portion 31 towards the first flange portion 32 and by rotating the rotated member by the required rotation angle RA, even when there are the individual differences in the length of the winding body portion 31 due to the manufacturing error, etc. of the winding core 30, it is possible to prevent the newly wound wire rod 1 from riding up on the wire rod 1 that has already been wound in the vicinity of the first flange portion 32 and to prevent the formation of the gap in the vicinity of the first flange portion 32. As a result, it is possible to improve the winding accuracy for the winding core 30.

In addition, the required rotation angle RA is set to the rotation angle of the rotated member since the time when the space length L1 is measured, and is set to the rotation angle of the rotated member required until the wire rod 1 wound around the winding body portion 31 comes into contact with the first flange portion 32.

With this configuration, the required rotation angle RA is set to the rotation angle of the rotated member that is required until the wire rod 1 wound around the winding body portion 31 comes into contact with the first flange portion 32. By rotating the rotated member by the required rotation angle RA that is set as described in this manner, it becomes possible to wind the wire rod 1 over the space length L without excess or shortage, and as a result, even when there are the individual differences in the length of the winding body portion 31 due to the manufacturing error, etc. of the winding core 30, it is possible to prevent the newly wound wire rod 1 from riding up on the wire rod 1 that has already been wound in the vicinity of the first flange portion 32 and to prevent the formation of the gap in the vicinity of the first flange portion 32.

In addition, at least one of the winding body portion 31 and the first flange portion 32 is made of resin.

With this configuration, because at least one of the winding body portion 31 and the first flange portion 32 is made of resin, there is a risk in that the individual difference is caused in the length of the winding body portion 31, and the size of a space between the first flange portion 32 and the second flange portion 33 due to the manufacturing errors, etc. However, because the wire rod 1 is wound over the space length L1, which is measured for each winding core 30, without excess or shortage, it is possible to improve the winding accuracy for the winding core 30 regardless of the manufacturing errors.

In addition, the wire winding device 100 includes the image acquisition device 40 capable of acquiring the image of the first flange portion 32 and the wire rod 1 during the process of the wire rod 1 is being wound around the winding body portion 31 towards the first flange portion 32, wherein the control unit 50 is configured to compute the space length L1 from the image acquired by the image acquisition device 40.

With this configuration, the space length L1 is computed on the basis of the image acquired by the image acquisition device 40. As described above, because the space length L1 is calculated by a relatively simple system, it is possible to suppress increase in the manufacturing cost of the wire winding device 100.

In addition, the wire winding method of winding the wire rod 1 delivered from the nozzle 24 around the winding core 30 by rotating either one of the nozzle 24 or the winding core 30 serving as the rotated member includes: a step of measuring the space length L1 between the wire rod 1 and the first flange portion 32 of the winding core 30 during the process of the wire rod 1 is being wound around the winding body portion 31 of the winding core 30 towards the first flange portion 32; a step of computing the required rotation angle RA of the rotated member based on the space length L1; and a step of rotating the rotated member by the required rotation angle RA.

With this configuration, the required rotation angle RA of the rotated member, which is required to wind, without excess or shortage, the wire rod 1 over the space length L between the wire rod 1 and the first flange portion 32 measured during the process of the wire rod 1 is being wound around the winding body portion 31 towards the first flange portion 32, is obtained and the rotated member is rotated by the required rotation angle RA, and thereby, even when there are the individual differences in the length of the winding body portion 31 due to the manufacturing error, etc. of the winding core 30, it is possible to prevent the newly wound wire rod 1 from riding up on the wire rod 1 that has already been wound in the vicinity of the first flange portion 32 and to prevent the formation of the gap in the vicinity of the first flange portion 32. As a result, it is possible to improve the winding accuracy for the winding core 30.

Embodiments of the present invention were described above, but the above embodiments are merely examples of applications of the present invention, and the technical scope of the present invention is not limited to the specific constitutions of the above embodiments.

The invention claimed is:

1. A wire winding device for winding a wire rod delivered from a nozzle around a winding core, the wire winding device comprising:
- the nozzle, configured to deliver the wire rod from a tip end portion thereof;
- a spindle configured to hold the winding core at a tip end portion thereof, the winding core having a winding body portion and a flange portion, the winding body portion being configured such that the wire rod delivered from the nozzle is wound around the winding body portion, and the flange portion is provided on one end side of the winding body portion;
- an image acquisition device having a camera and a mirror disposed between the camera and an object, the camera being capable of acquiring an image of the object during a winding process in which the wire rod is being wound around the winding body portion towards the flange portion, the object including both the flange portion and the wire rod; and
- a control circuit configured to control rotation of the winding core serving as a rotated member, wherein
- the camera and the mirror are arranged such that a viewing direction of the image acquisition device, which is a direction from a center of the camera toward a center of the mirror, is set to be parallel to a direction of a rotation axis of the winding core held by the spindle, and
- the mirror is arranged such that the mirror redirects a light in the viewing direction from a lens of the camera to a center of the object of the image.

2. The wire winding device according to claim 1, wherein the mirror is a right-angle prism mirror.

3. The wire winding device according to claim 1, wherein the image acquisition device further includes a lighting device for lighting the object and a white or metallic glossy background screen disposed behind the object.

4. The wire winding device according to claim 1, wherein a height of the center of the camera is set such that the flange portion and the wire rod extending from the nozzle to the winding core are included within one image.

5. The wire winding device according to claim 1, wherein during the winding process, the control circuit extracts an edge line of the wire rod on the flange portion side and an end surface of the flange portion from the image, calculates a distance between the edge line and the end surface as a space length between the wire rod and the flange portion, computes a required rotation angle of the rotated member based on the space length, and rotates the rotated member by the required rotation angle.

6. A manufacturing method for manufacturing a coil by using the wire winding device according to claim 1.

* * * * *